(No Model.)
S. H. SHORT.
MEANS FOR CONTROLLING ELECTRIC MOTORS.
No. 588,021. Patented Aug. 10, 1897.
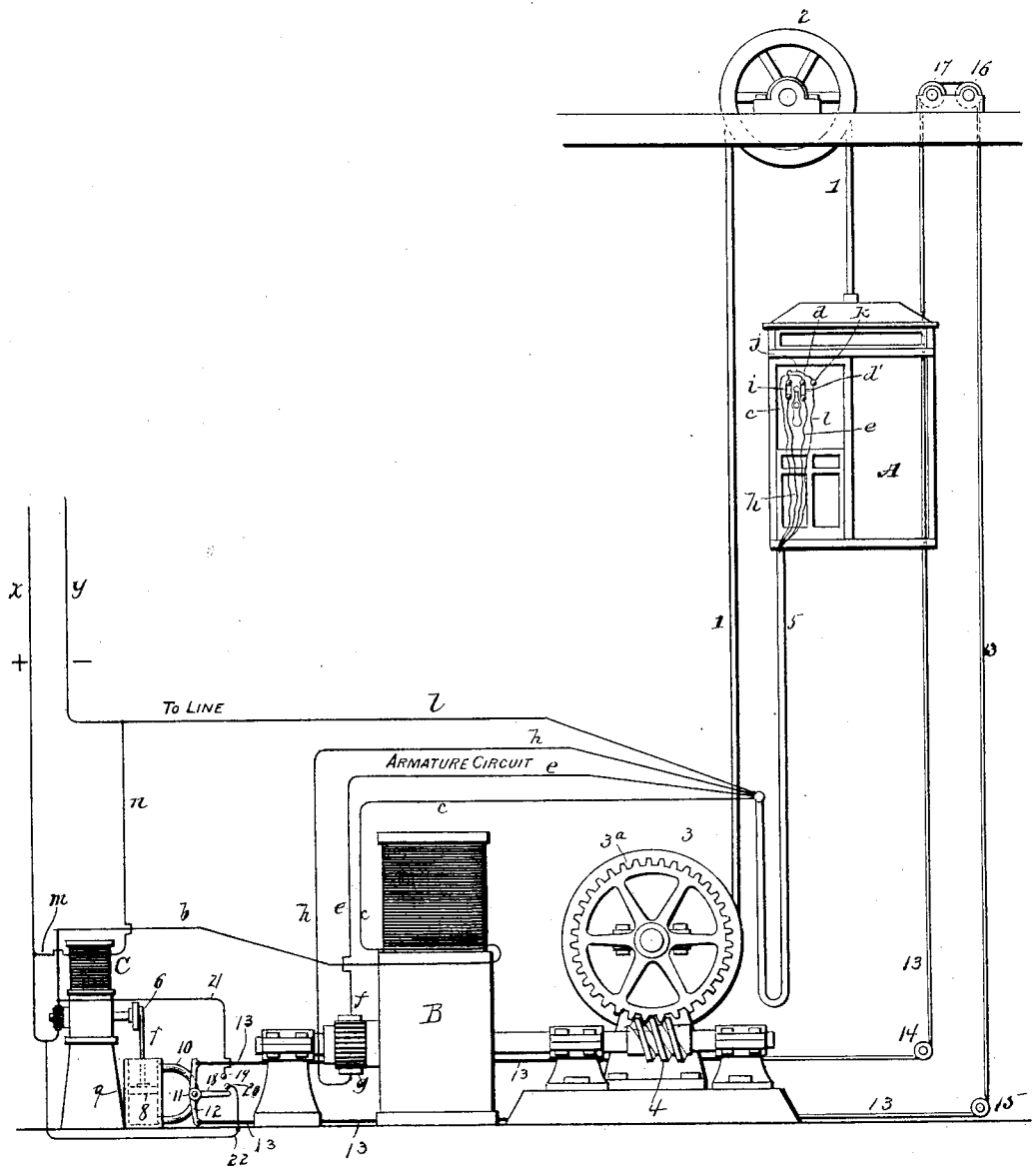
Witnesses
E. J. Nottingham
G. F. Downing.
Inventor
Sidney H. Short
By H. A. Seymour
Attorney

UNITED STATES PATENT OFFICE.

SIDNEY H. SHORT, OF CLEVELAND, OHIO.

MEANS FOR CONTROLLING ELECTRIC MOTORS.

SPECIFICATION forming part of Letters Patent No. 588,021, dated August 10, 1897.

Application filed May 7, 1896. Serial No. 590,595. (No model.)

*To all whom it may concern:*

Be it known that I, SIDNEY H. SHORT, a resident of Cleveland, in the county of Cuyahoga and State of Ohio, have invented certain new and useful Improvements in Means for Controlling Electric Motors; and I do hereby declare the following to be a full, clear, and exact description of the invention, such as will enable others skilled in the art to which it appertains to make and use the same.

My invention relates to means for controlling electric motors.

In electric elevators, hoists, and other systems employing electric motors it has been the usual custom to employ a variable resistance in the circuit through which current is supplied to the motors from the main line in order to regulate the amount of current supplied to the motor and in starting the motor to prevent the full electromotive force of the line from being suddenly applied to the motor; but the use of such variable resistance is open to various objections, among which may be mentioned waste of energy and the necessity for breaking the circuit while considerable current is flowing therein, which results in arcing at the contacts and destruction of parts of the controller.

The object of my invention is to obviate the objectionable features of a variable-resistance controller and to provide simple and efficient means whereby a variable counter electromotive force in the motor-circuit can be generated and utilized to regulate and control the amount of current flowing to the motor and thereby insure the gradual starting and stopping of the motor and the regulation of its speed when in operation.

With this object in view the invention consists in the combination, with a stationary driving electric motor and means for transmitting power from said driving motor, of a controlling electric motor included in circuit with the driving-motor and adapted to generate a counter electromotive force which shall operate to regulate and control the amount of current flowing to the driving-motor.

My invention further consists in the combination, with a stationary driving electric motor and means for transmitting power therefrom, of a controlling electric motor included in circuit with the driving-motor and suitable means for controlling the operation of the controlling-motor whereby to vary the counter electromotive force generated by said controlling-motor for the purpose of regulating and controlling the amount of current flowing to the driving-motor.

My invention further consists in the combination, with a stationary driving motor and means for transmitting power therefrom, of a controlling-motor in the circuit of the driving-motor and devices connected with the armature of the controlling-motor for varying the speed of the same whereby to vary the counter electromotive force generated by said controlling-motor, said devices being adapted to be under the control of an operator; and the invention further consists in certain novel features of construction and combinations and arrangement of parts, as hereinafter set forth, and pointed out in the claims.

In the accompanying drawing the figure is a view showing the application of my improvements for operating an elevator.

A represents an elevator-car, which may be supported by a cable 1, and the latter, after passing over a pulley 2, extends down to the basement of the building in which the elevator is located, where it is wound on a drum 3. A worm-wheel $3^a$ is secured to one end of the drum and receives motion from a worm 4, the latter being operated by the armature of a driving electric motor B.

The operation of the motor B for causing the car A to ascend or descend may be accomplished in any suitable manner. With the construction and arrangement of parts shown in the drawing a reversing-switch might be employed for effecting a reversal of rotation of the armature of the driving-motor. When the reversing-switch is employed, the necessary wires can be connected with it by providing a flexible cable 5 of four conductors, one end of said cable being attached to the car and the other end to any suitable device at the bottom of the elevator-shaft. The electric current entering by the conductor $x$ will flow through the armature-coils of a small controlling-motor C, then by a wire $b$ to and through the field-magnet coil of the driving-motor B, then by a wire $c$ through the cable 5 to the contact-block $d$ of the reversing-switch, then (with the reversing-switch arranged as shown in the drawing) the current will flow through the arm $d'$ of the reversing-switch and the wire $e$ to the commutator-brush $f$ of the driving-motor, then through the armature-coils of the driving-motor, then from the commutator-brush $g$ through the wire $h$ to the arm $i$ of the reversing-switch, then through connector $j$ to contact-block $k$ of the reversing-switch, and from said block $k$ the current will flow through the wire $l$ to the line conductor $y$. It is preferable (although not absolutely essential) to cause the field-magnet of the small motor C to be separately excited, and for this purpose the coil of said field-magnet is included in a shunt-circuit (traced by the wires $m$ $n$) between the line-terminals $x$ $y$.

The armature-shaft of the controlling-motor C is provided with a crank or eccentric 6, to which one end of a pitman 7 is connected, the other end of said pitman being connected with the plunger 8 of a pump 9. A pipe 10 communicates with the pump-cylinder 9 at respective sides of the piston 8, and between the ends of this pipe a valve 11 (preferably a plug-valve) is located. The valve 11 may be provided with an arm or cross-head 12, to which the ends of an operating-cord 13 may be attached. From its connections with the cross-head or arm 12 the cord 13 passes over suitable pulleys 14 15 and then upwardly and over pulleys 16 17 at the top of the elevator-shaft, one vertical member of said operating-cord passing through the car A within easy reach of the operator.

The cylinder of the pump 9 and the pipe 10 are filled or nearly filled with liquid, preferably such as oil or glycerin, so that when the armature of the controlling-motor C is rotating and the valve 11 is open the pump will operate to cause the liquid to pass and repass or circulate freely through the pipe 10, which operation will put but little work on the armature of the controlling-motor, and the load on the latter will, under such conditions, be practically at zero. It is apparent that if the valve 11 be closed to a greater or less extent the passage of the liquid through the pipe 10 would be proportionately checked and the work on the controlling-motor would be increased on account of the resistance thus added to the operation of the pump to force the liquid through the pipe 10. Should the valve 11 be entirely closed, the pump could not operate at all and the armature of the controlling-motor would come to rest. It will be seen that the mechanism comprising the pump 9, pipe 10, and valve 11 constitute, in effect, a brake for the armature of the controlling-motor C.

When the armature of the driving-motor is at rest, the valve 11 will be open, so as to permit the armature of the controlling-motor to run free—that is to say, so that there will be no load on it. Under such conditions a heavy current will be caused to flow through the field-coils of the controlling-motor, thereby producing a strong field which will result in a comparatively slow rotation of the armature and the generation in the armature-coils of a large counter electromotive force which will nearly equal the electromotive force of the line. Under these conditions only a few amperes of current can pass through the armature-circuit of the controlling-motor to the driving-motor and not enough to operate the latter.

To start the driving-motor, so as to cause the elevator-car to ascend or descend, (the reversing-switch on the car having been properly adjusted,) the operator will pull the cord 13, whereby to turn the valve 11, and thus cause the speed of the armature of the controlling-motor to be gradually retarded in the manner above explained. The speed of the armature being thus reduced, the counter electromotive force generated thereby will also be reduced, with the result that a sufficiently-increased amount of current will flow through the armature-circuit of the controlling-motor and from thence to the driving-motor to actuate the latter. By gradually increasing the load on the controlling-motor through the medium of the brake devices above described the speed of its armature will be gradually diminished and the counter electromotive force gradually reduced, with the result that a corresponding increase of current will be permitted to flow to the driving-motor, and by so increasing the load on the controlling-motor as to bring its armature to a state of rest no counter electromotive force will be generated, and hence the maximum amount of current may then be supplied to the driving-motor.

By reversing the operations above described the driving-motor may be gradually retarded and finally brought to a state of rest.

When the valve 11 shall have been entirely closed and the controlling-motor brought to a state of rest, the armature of said motor may be cut out of circuit. This can be readily accomplished by providing the arm or cross-head 12 of the valve 11 with a switch-arm 18, which, when the valve is closed, will electrically connect two contact-plates 19 20, the latter being connected by wires 21 22 with the respective terminals of said armature.

I do not in this case claim, broadly, the combination, with a driving electric motor, of a controlling electric motor included in circuit with the driving-motor, said controlling-motor being adapted to generate counter electromotive force in the circuit of the driving-motor, and means, such as a brake, for controlling the controlling-motor in such manner as to vary the counter electromotive force sufficiently to effect the starting, stopping, and regulation of the driving-motor, as such invention broadly constitutes the subject of a separate application for patent filed by me and designated by Serial No. 581,992.

Having fully described my invention, what

I claim as new, and desire to secure by Letters Patent, is—

1. The combination with an elevator and a driving electric motor, of a controlling electric motor constructed and adapted to generate counter electromotive force in the circuit of the driving-motor, a brake for controlling the rotation of the armature of the controlling-motor and vary the counter electromotive force generated therein for effecting the starting and stopping of the driving-motor, a switch for cutting the controlling-motor out of circuit, and connections between the brake and switch and the elevator, whereby the operator can manually operate said brake and switch from his position in the elevator, substantially as set forth.

2. The combination with a driving electric motor, of a controlling electric motor in the circuit of the driving-motor, a brake for controlling the speed of the armature of the controlling-motor, and a switch connected with a part of the brake so that when the brake is applied sufficiently to stop the armature of the controlling-motor, said armature will be short-circuited, substantially as set forth.

3. The combination with a driving electric motor, of a controlling electric motor constructed and adapted to generate counter electromotive force in the circuit of the driving-motor, a fluid-brake connected with the armature of the controlling-motor, a valve for controlling said fluid-brake whereby to vary the load on the armature of the controlling-motor and manually-operated devices connected with the said valve, whereby to control it and effect the starting of the driving-motor, substantially as set forth.

4. The combination with a driving electric motor, of a controlling electric motor, a fluid-brake connected with the armature of the controlling-motor, a valve for controlling said fluid-brake whereby to vary the load on the armature of the controlling-motor, and a switch connected with said valve for short-circuiting the controlling-motor, substantially as set forth.

5. The combination with an elevator and a driving electric motor for operating the same, of a controlling electric motor in circuit with the driving-motor, a fluid-brake connected with the armature of the controlling-motor, a valve for controlling said fluid-brake whereby to vary the load on the armature of the controlling-motor, and an operating device connected with said valve and adapted to be actuated by the operator on the elevator, substantially as set forth.

6. In apparatus for controlling electric motors, the combination with a driving-motor, of a controlling-motor having its armature connected in series with the driving-motor and having a separately-excited field-magnet, a pump connected with the armature of the controlling-motor, means for varying the resistance to the operation of the pump, and means for short-circuiting the controlling-motor when the maximum resistance to the operation of the pump is attained, substantially as set forth.

7. In apparatus for controlling electric motors, the combination with a driving-motor, of a controlling-motor having its armature connected in series with the driving-motor and having a separately-excited field, a pump connected with the armature of the controlling-motor, a by-pass connected at its ends with the pump-cylinder at opposite sides of the plunger, a valve between the ends of said by-pass, a manually-operated device connected with said valve, an electric circuit around the armature of the controlling-motor and normally open when the valve is open and a contact-arm connected with the manually-operated device for closing said open circuit when the valve is closed whereby to short-circuit the controlling-motor, substantially as set forth.

In testimony whereof I have signed this specification in the presence of two subscribing witnesses.

SIDNEY H. SHORT.

Witnesses:
F. W. BUNTS,
E. T. SARGENT.